US008369796B2

(12) United States Patent
Pan et al.

(10) Patent No.: US 8,369,796 B2
(45) Date of Patent: Feb. 5, 2013

(54) MULTI-BAND TUNABLE FREQUENCY RECONFIGURABLE ANTENNAS USING HIGHER ORDER RESONANCES

(75) Inventors: Helen K. Pan, Portland, OR (US); Songnan Yang, Knoxville, TN (US); Debabani Choudhury, Thousand Oaks, CA (US); Vijay K. Nair, Mesa, AZ (US)

(73) Assignee: Intel Corporation, Santa Clara, CA (US)

( * ) Notice: Subject to any disclaimer, the term of this patent is extended or adjusted under 35 U.S.C. 154(b) by 1268 days.

(21) Appl. No.: 11/644,741

(22) Filed: Dec. 22, 2006

(65) Prior Publication Data

US 2008/0150830 A1 Jun. 26, 2008

(51) Int. Cl.
*H04B 1/44* (2006.01)

(52) U.S. Cl. .................... 455/78; 455/575.7; 455/552.1; 455/82; 455/121; 455/115.1; 455/123; 455/226.1; 455/101; 455/277.2; 455/83; 343/702; 343/876; 343/846; 343/810; 343/818

(58) Field of Classification Search .................... 455/78, 455/575.7, 552.1, 82, 83, 121, 115.1, 123, 455/226.1, 101, 277.2; 343/876, 702, 700, 343/846, 810, 818
See application file for complete search history.

(56) References Cited

U.S. PATENT DOCUMENTS 6,021,317 A * 2/2000 Irvin ............................... 455/78
6,061,024 A * 5/2000 McGirr et al. ......... 343/700 MS
6,166,694 A * 12/2000 Ying ...................... 343/700 MS
6,204,819 B1 3/2001 Hayes et al.
6,529,749 B1 * 3/2003 Hayes et al. ............... 455/575.7
6,662,028 B1 12/2003 Hayes et al.
6,950,065 B2 * 9/2005 Ying et al. ............. 343/700 MS
7,136,020 B2 11/2006 Yamaki
7,180,465 B2 * 2/2007 Lynch et al. .................. 343/833
7,276,990 B2 * 10/2007 Sievenpiper .................. 333/101
7,292,201 B2 * 11/2007 Nagaev et al. ................ 343/818
7,321,335 B2 * 1/2008 Egorov et al. ................. 343/702
7,411,554 B2 * 8/2008 Jung et al. .............. 343/700 MS
2003/0219035 A1 * 11/2003 Schmidt ......................... 370/478
2004/0135649 A1 7/2004 Sievenpiper
2006/0001123 A1 * 1/2006 Heck et al. ..................... 257/528
2006/0097918 A1 5/2006 Oshiyama et al.
2007/0273606 A1 * 11/2007 Mak et al. ...................... 343/876

FOREIGN PATENT DOCUMENTS

JP 2003258523 9/2003
JP 2006054639 2/2006
JP 2006-086630 A 3/2006
JP 2007520955 7/2007
KR 1020060096693 9/2006
WO 2004047223 6/2004

OTHER PUBLICATIONS

Japan Office Action Patent Application No. 2009-542779, mailing date Feb. 14, 2012, 4 pages.

* cited by examiner

*Primary Examiner* — Matthew Anderson
*Assistant Examiner* — Ganiyu A Hanidu
(74) *Attorney, Agent, or Firm* — Kacvinsky Daisak PLLC

(57) ABSTRACT

A wireless device using natural higher order harmonics on multi-band reconfigurable antenna designs where the antenna higher order resonance is used to build a multi-band to multi-band frequency reconfigurable antenna.

14 Claims, 8 Drawing Sheets

FREQUENCY BANDS - GSM 850, PCS 1900, GSM 900, DCS 1800 and IMT 2000

880 MHz, PEAK GAIN ~4dBi

1940 MHz, PEAK GAIN ~4dBi 2.4 and 5GHz WLAN BANDS 2.4 GHz, PEAK GAIN ~2dBi

5 GHz, PEAK GAIN ~6dBi

MULTI-BAND TUNABLE FREQUENCY RECONFIGURABLE ANTENNAS USING HIGHER ORDER RESONANCES

Recent developments in a number of different digital technologies have greatly increased the need to transfer large amounts of data from one device to another or across a network to another system. Technological developments permit digitization and compression of large amounts of voice, video, imaging, and data information, which may be rapidly transmitted from computers and other digital equipment to other devices within the network. Computers have faster central processing units and substantially increased memory capabilities, which have increased the demand for devices that can more quickly store and transfer larger amounts of data.

To transfer data, mobile wireless devices incorporate Radio Frequency (RF) subsystems to support the multiple frequency ranges that may be needed. The radio subsystems may include a single band antenna, multi-band antenna or broadband antenna. Single band antenna may increase the platform space as more radios are integrated into the platform. Multi-band antenna may limit operation to three or four bands to maintain desirable antenna performance in those bands. The broadband antenna may introduce undesired out of band noise that necessitates RF front end band pass filters. Clearly, the developments in digital technology have stimulated a need to deliver data and improvements in multi-radio subsystems in the same platform are needed.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
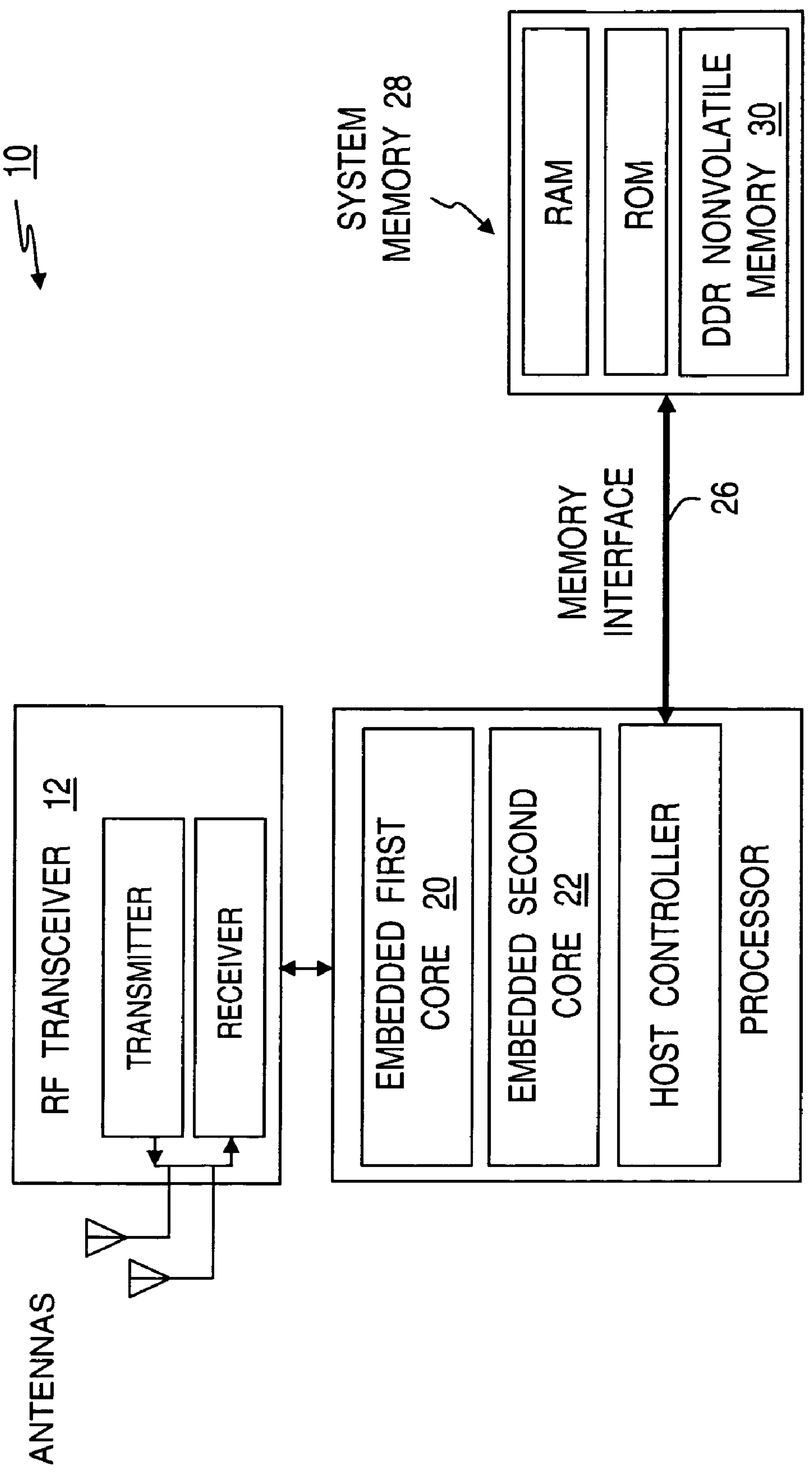
FIG. 1 is a diagram that illustrates a wireless device and implementation with a multi-band tunable frequency reconfigurable antenna(s) using higher order resonances in accordance with the present invention.

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

The embodiment illustrated in FIG. 1 shows a wireless communications device 10 that includes one or more radios to allow communication with other devices. Communications device 10 may operate in wireless networks such as, for example, Wireless Fidelity (Wi-Fi) that provides the underlying technology of Wireless Local Area Network (WLAN) based on the IEEE 802.11 specifications, WiMax and Mobile WiMax based on IEEE 802.16-2005, Wideband Code Division Multiple Access (WCDMA), and Global System for Mobile Communications (GSM) networks, although the present invention is not limited to operate in only these networks. The multi-radio subsystem collocated in the same platform of communications device 10 provides the capability of communicating in an RF/location space with the other devices in the network. Accordingly, the advanced mobile platform of communications device 10 includes an antenna(s) that permits adaptive tuning to different frequencies to meet the requirements of the multi-radio platforms.

It should be noted that communications device 10 may have applications in a variety of products. For instance, the claimed subject matter may be incorporated into desktop computers, laptops, smart phones, MP3 players, cameras, communicators and Personal Digital Assistants (PDAs), medical or biotech equipment, automotive safety and protective equipment, automotive infotainment products, etc. However, it should be understood that the scope of the present invention is not limited to these examples.

FIG. 1 illustrates the mobile platform of communications device 10 with a transceiver 12 and antenna to receive and transmit a modulated signal. The figure shows a simplistic embodiment to illustrate the coupling of antenna(s) to the transceiver to accommodate modulation/demodulation. In general, analog front end transceiver 12 may be a stand-alone Radio Frequency (RF) discrete or integrated analog circuit, or transceiver 12 may be embedded with a processor as a mixed-mode integrated circuit where the processor processes functions that fetch instructions, generate decodes, find operands, and perform appropriate actions, then stores results. The processor may include baseband and applications processing functions and utilize one or more processor cores to handle application functions and allow processing workloads to be shared across the cores. The processor may transfer data through an interface 26 to memory storage in a system memory 28 that may include a combination of memories such as a Random Access Memory (RAM), a Read Only Memory (ROM) and a nonvolatile memory, although neither the type of memory, variety of memories, nor combination of memories included in system memory 28 is a limitation of the present invention.

Figure 2:
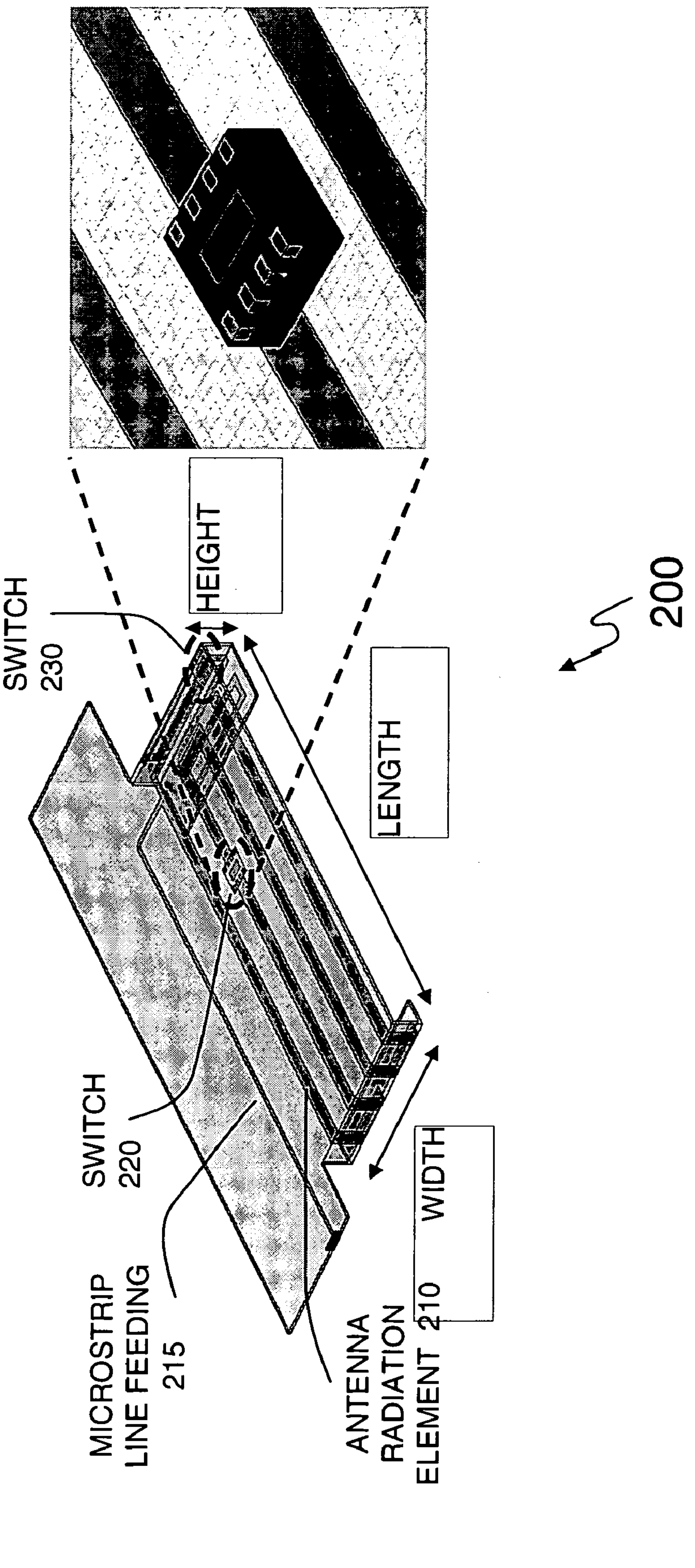
FIG. 2 is a diagram that illustrates an embodiment of the multi-band tunable frequency reconfigurable antenna in accordance with the present invention.

FIG. 2 is a block diagram that illustrates one embodiment of the present invention for a frequency reconfigurable antenna with the flexibility to adaptively meet multi-radio platform requirements. Communications device 10 includes an antenna design that groups adjacent frequency bands together with the following table describing possible band groupings for 3G cellular and WLAN.

| 3G Cellular Bands - North America Frequencies Protocol | | |
|---|---|---|
| BAND 1: GSM 850 | TX range: 824~849/850 MHz | RX range: 869~894 MHz |
| BAND 2: PCS 1900 | TX range: 1850~1910 MHz | RX range: 1930~1990 MHz |

| 3G Cellular Bands - Europe/Asia Frequencies Protocol | | |
|---|---|---|
| BAND 3: GSM 900 | TX range: 880~915/900 MHz | RX range: 925~960 MHz |
| BAND 4: DCS 1800 | TX range: 1710~1785 MHz | RX range: 1805~1880 MHz |
| BAND 5: IMT 2000 | TX range: 1920~1980 MHz | RX range: 2110~2170 MHz WCDMA, HSDPA |

| WLAN Bands - Frequencies Protocol | |
|---|---|
| BAND 6: | 2.4-2.484 GHz (802.11b/g) |
| BAND 7: | 4.9-5.9 GHz (802.11a) |

FIG. 2 shows a bent monopole antenna with an antenna radiation element 210 that may be tuned using two switches, i.e., switch 220 and switch 230, to accommodate the seven frequency bands in the cellular and WLAN communication systems. The seven cellular and WLAN bands may be divided into two separate groups and switches 220 and 230 may be appropriately switched to provide operation in both frequency band groups. Embodiments of communications device 10 may use this multi-band to multi-band frequency reconfigurable antenna to realize a smaller antenna size and use a fewer number of switches in simplifying the platform integration to achieve a lower manufacturing cost. By choosing different antenna radiation element widths and shapes, the multiple higher order harmonic resonance modes may be tuned with various ratios as long as the feeding input impedance is close to 50 ohms as shown in FIG. 2 with the 50 ohms microstrip feeding line 215.

Switches 220 and 230 may be placed either on the top or on the bottom of the flexible substrate. Whereas prior art devices typically use switches on the top of the substrate, in accordance with the present invention the switches may also be placed on the bottom of the flexible substrate in order to reduce the height of the switch package. By placing switches 220 and 230 underneath the flexible substrate, the flexible substrate may be placed or embedded inside the mechanical casing of the laptop lid, i.e., the area around the Liquid Crystal Display (LCD) screen. In some embodiments selected areas on the mechanical casing edge may be cut to provide places for the switches. Thus, excess switch package height may be eliminated from the top of the antenna pattern. Note that the switches on the bottom of the antenna substrate may be connected to the antenna metal patterns on the top side of the flexible substrate using vias filled with a metal.

Antenna 200 may be designed to operate in the lowest frequency band and switch to higher frequency operation using RF switches such as, for example, Micro-Electrical-Mechanical (MEM) switches, Field Effect Transistor (FET) switches and PIN diode switches. Antenna 200 may adaptively reconfigure to operate in different frequency bands by using the switches to achieve different electrical lengths and current distributions.

In operation, both switch 220 and switch 230 may be closed to allow antenna 220 to communicate in the five cellular bands listed as GSM 850, PCS 1900, GSM 900, DCS 1800 and IMT 2000. In another switch setting, switches 220 and 230 may both be open to allow antenna 200 to communicate in the WLAN bands denoted by band 6 and band 7. Note that switches 220 and 230 may both turn on or turn off at approximately the same time so that one DC switch control line is able to tune reconfigurable antenna 200 to the different multi-band stages.

Again, with switches 220 and 230 both in a closed position communications device 10 is configured to operate in the cellular mode and provide communications at frequencies in the range of 824-960 MHz, BW=15% to cover GSM850 and 900 bands 1710-2170 MHz, BW=23.7% to cover DCS/PCS/WCDMA. With switches 220 and 230 both in an open position communications device 10 is configured to operate in the WLAN mode and provide communications at frequencies in the range of 2.4-2.48 GHz, BW=3.5% for 802.11 b/g/n 4.9-5.9 GHz, BW=18.5% to indoor/outdoor 802.11 a/n.

Although FIG. 2 illustrates two RF switches to configure operation of antenna 200 to cover the five cellular bands and the two WLAN bands, it should be pointed out that in some embodiments one switch may be sufficient. However, the second RF switch provides another resonating branch to broaden the bandwidth of the antenna. Note from the figure that the RF packaged switches may be placed on the back of the substrate to reuse the antenna bended height shown in microstrip line 210. Further, the RF switches may be embedded into antenna designs without increasing the dimensions of the antenna.

Figure 3:
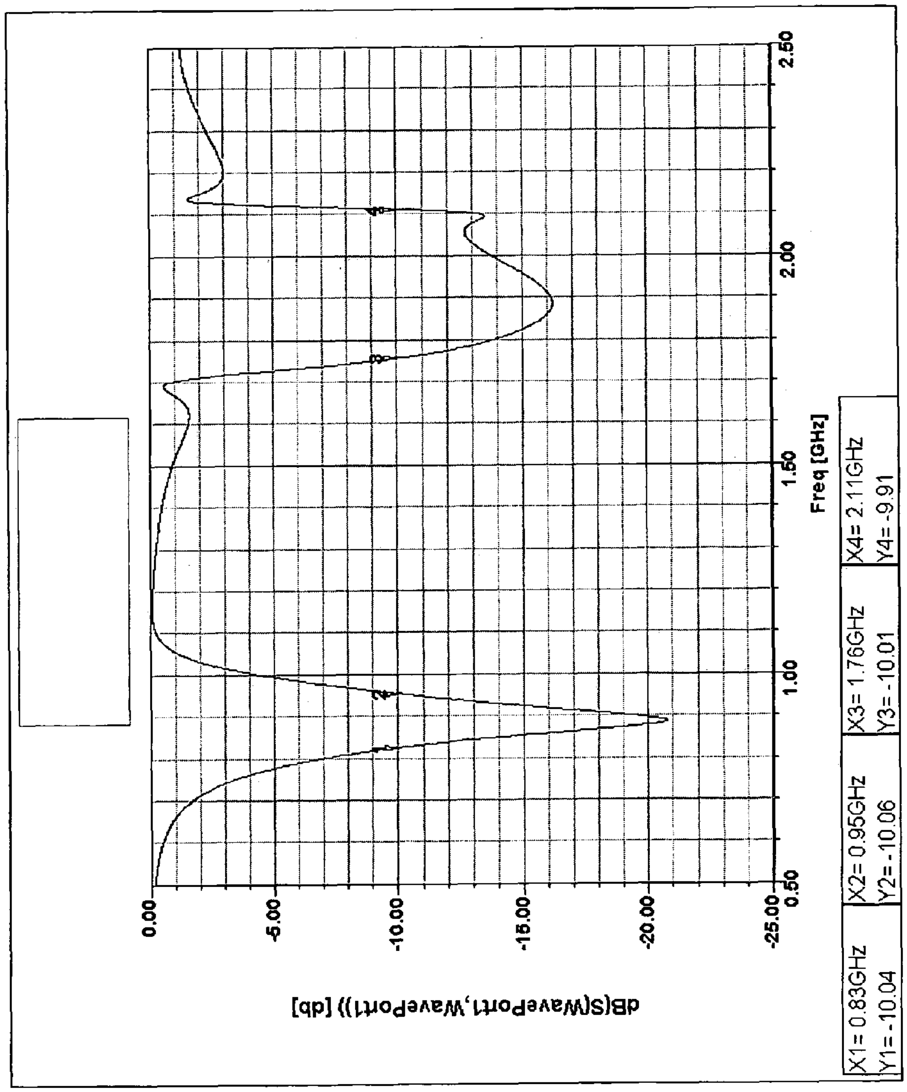
FIGS. 3-5 are diagrams that illustrate characteristics of the multi-band tunable frequency reconfigurable antenna operating in the frequency bands for GSM 850, PCS 1900, GSM 900, DCS 1800 and IMT 2000.
Figure 4:
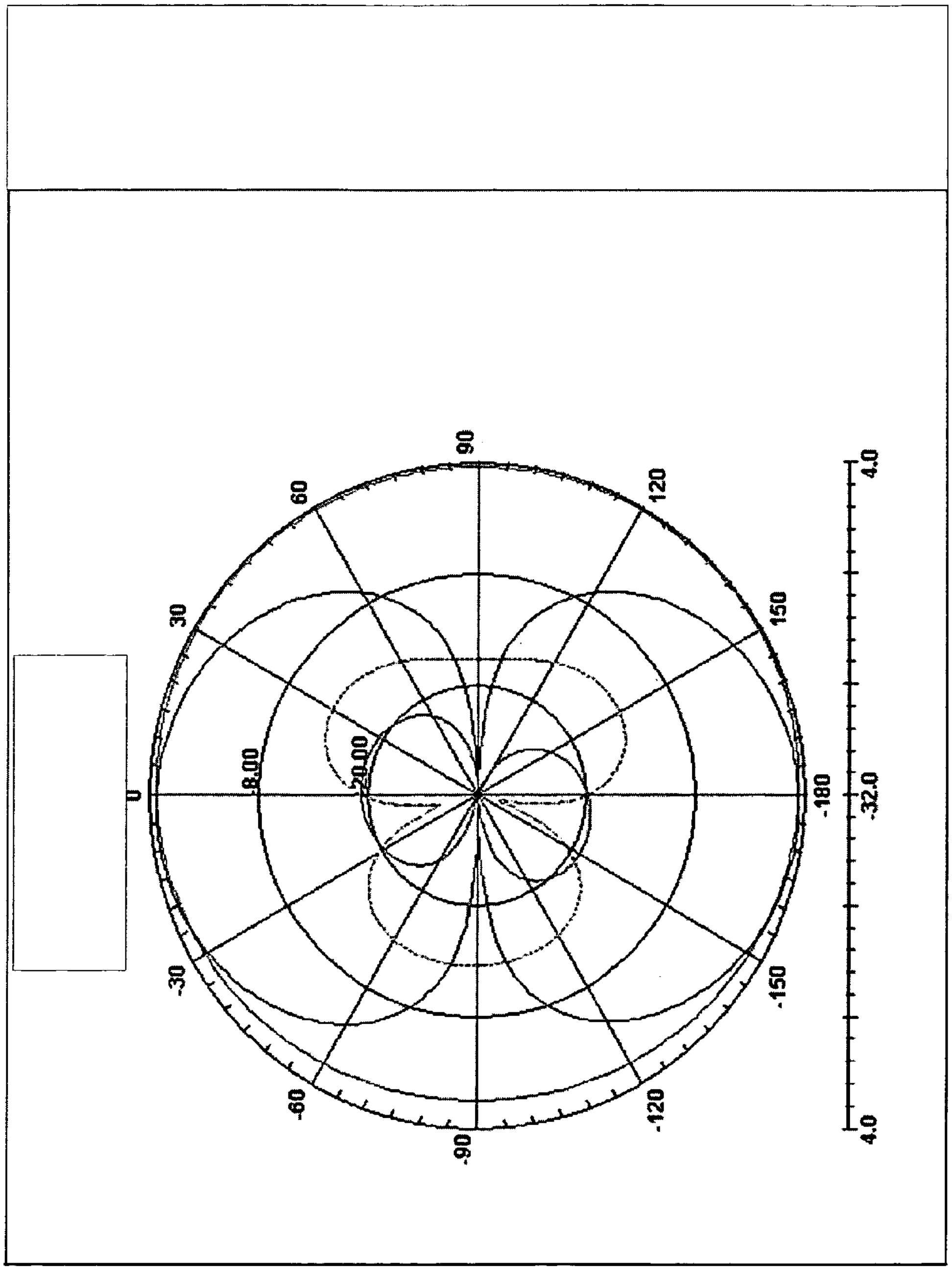
Figure 5:
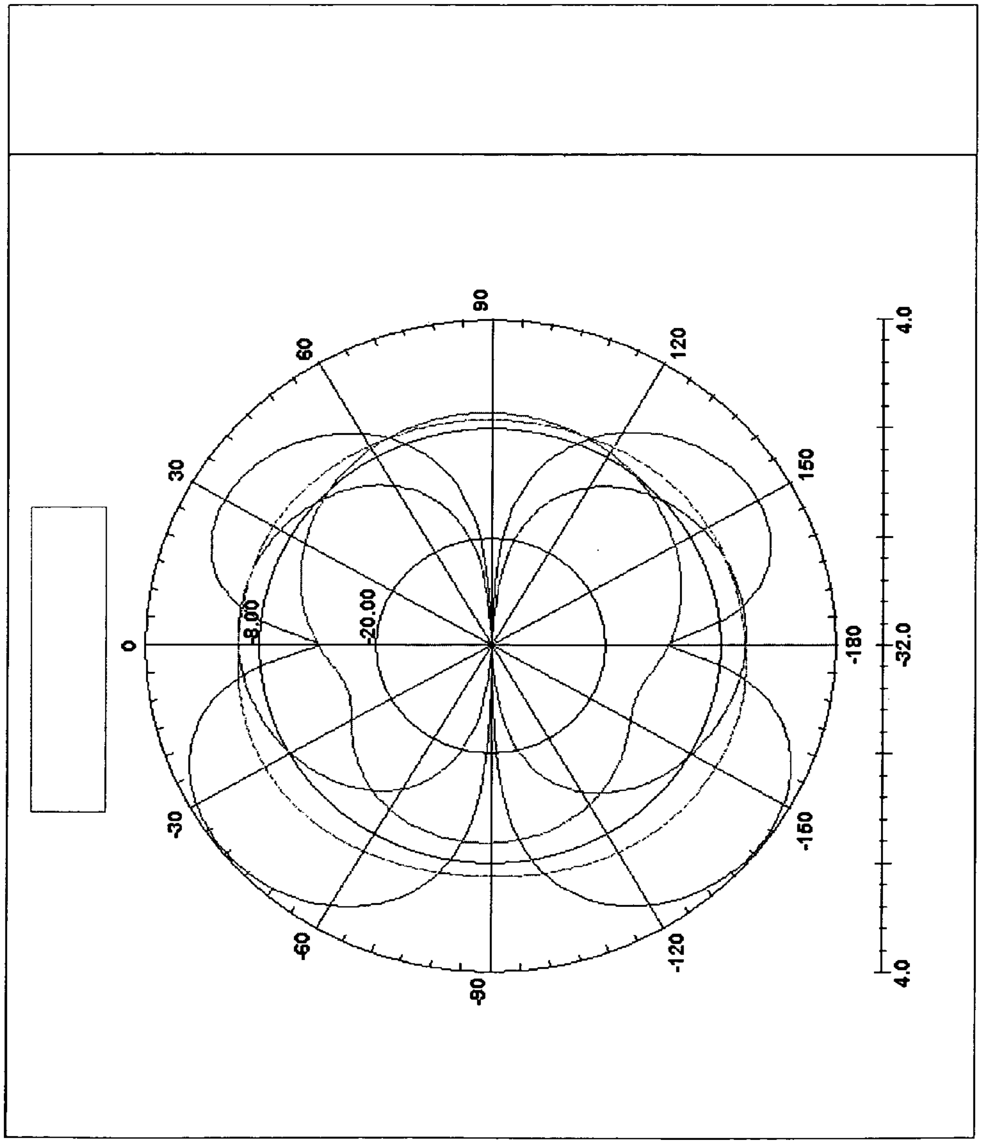

FIGS. 3-5 represent characteristics of the bent monopole antenna 200 with both switches in FIG. 2 in a closed position to allow communication in the five cellular bands listed as GSM 850, PCS 1900, GSM 900, DCS 1800 and IMT 2000. In particular, FIG. 3 shows the simulated return loss in cellular configurations, FIG. 4 shows radiation patterns of the reconfigurable antenna at 880 MHz, peak gain ~4 dBi, and FIG. 5 shows radiation patterns at 1940 MHz, peak gain ~4 dBi.

Figure 6:
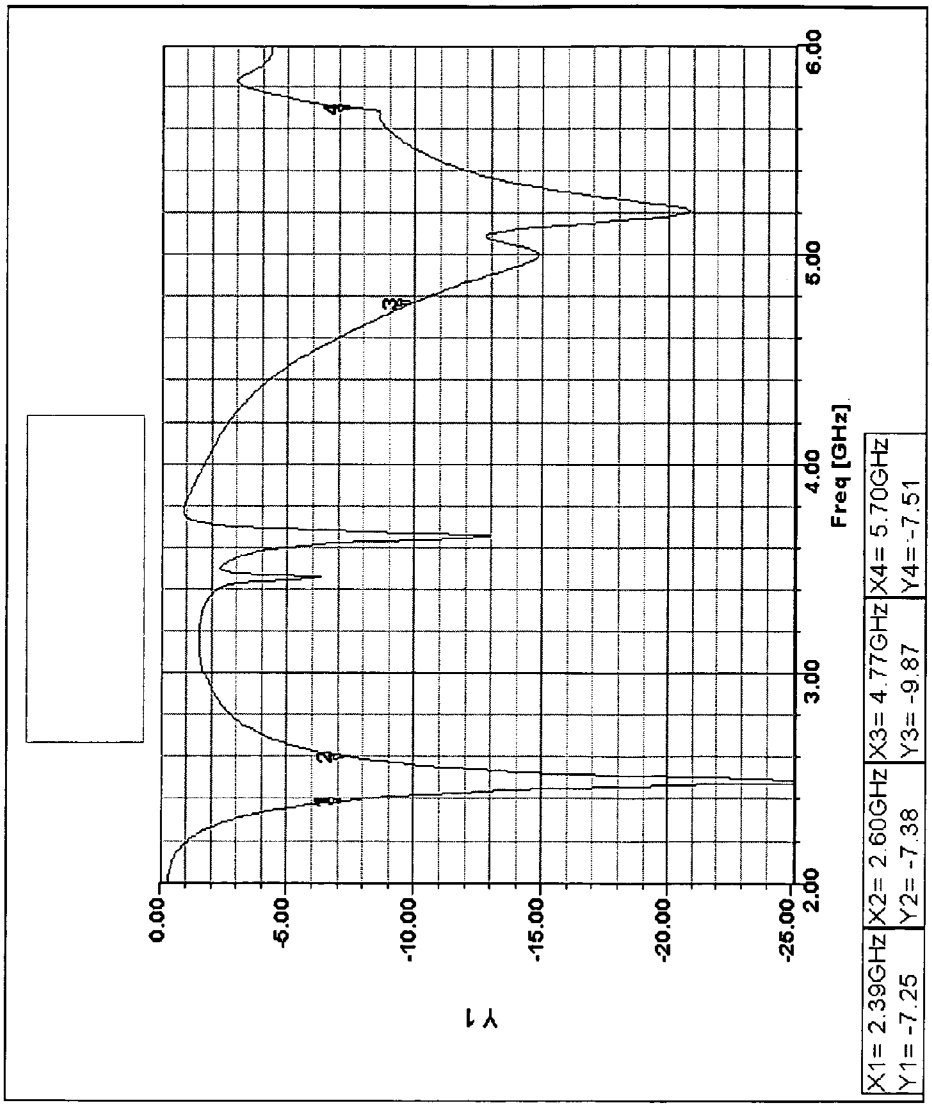
FIGS. 6-8 are diagrams that illustrate characteristics of the multi-band tunable frequency reconfigurable antenna operating in the frequency bands for WLAN.
Figure 7:
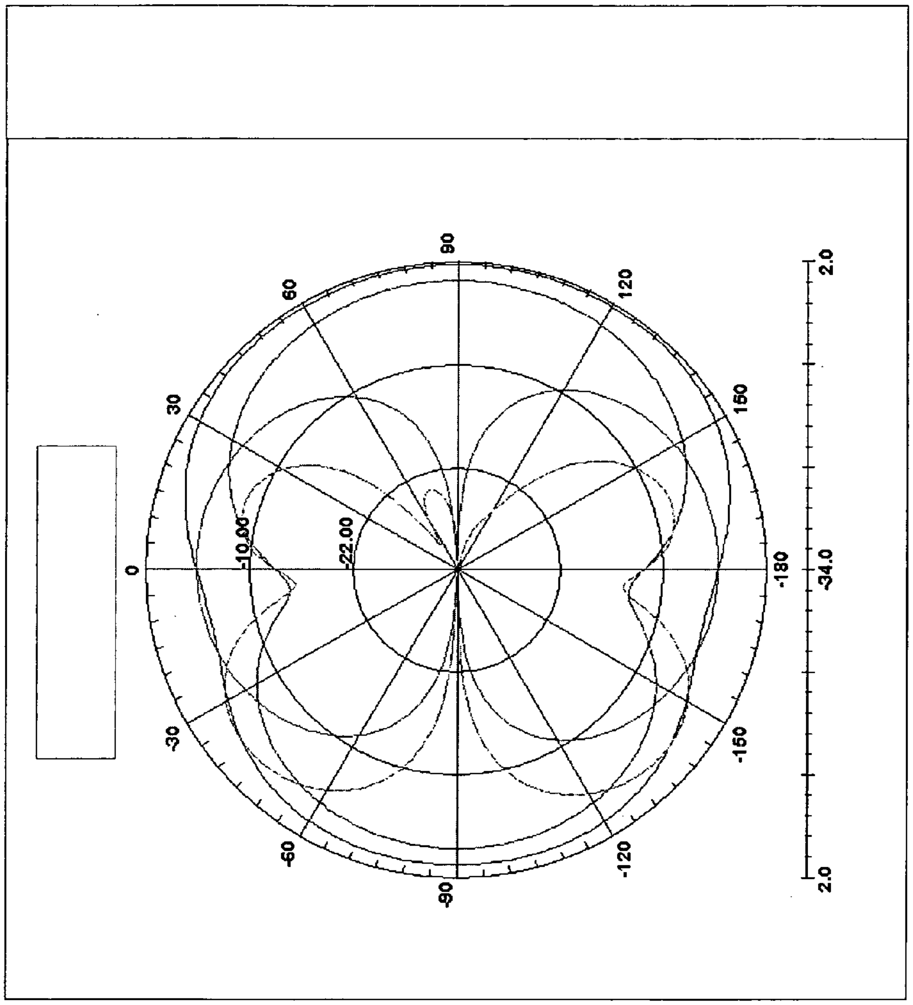
Figure 8:
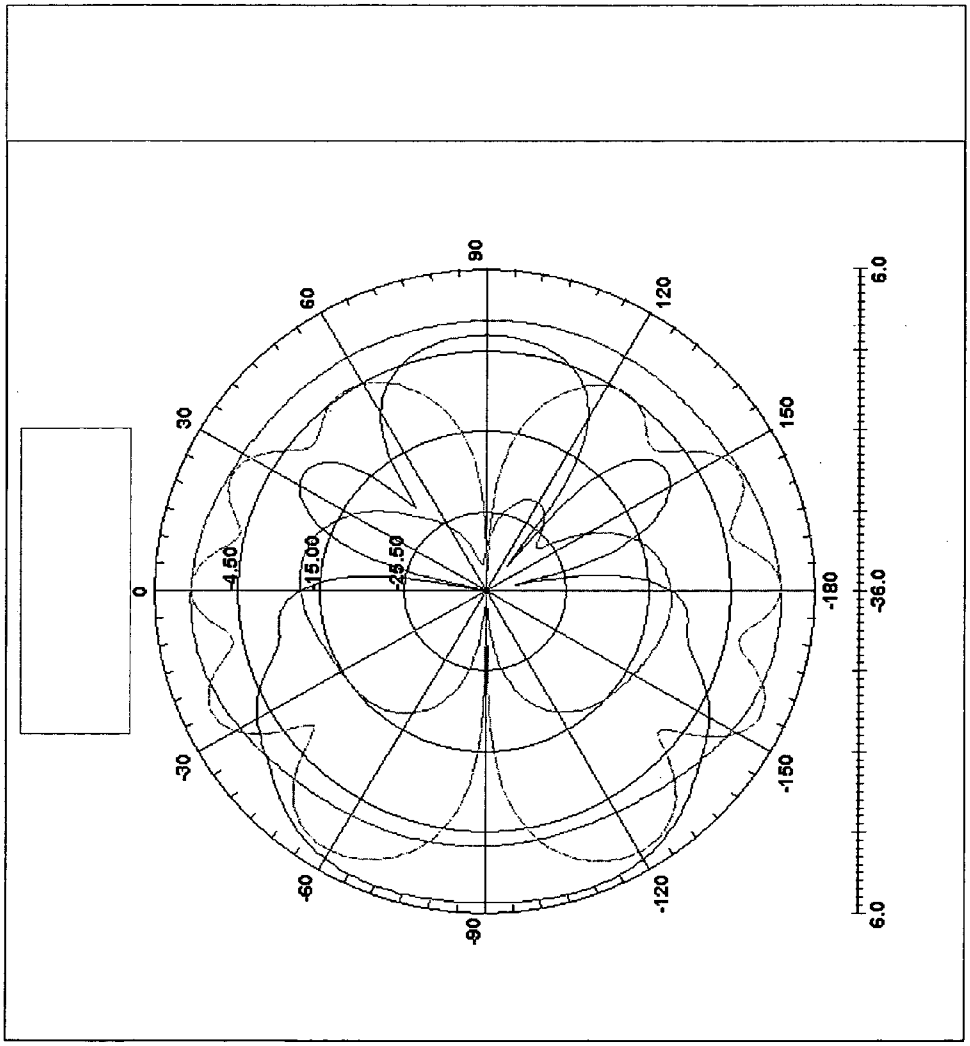

FIGS. 6-8 represent characteristics of the bent monopole antenna 200 with both switches in FIG. 2 in an open position to allow communication in the WLAN bands listed as BAND 6 and BAND 7. In particular, FIG. 6 shows the simulated return loss in the WLAN configurations, FIG. 7 shows radiation patterns of the reconfigurable antenna at 2.4 GHz, peak gain ~2 dBi, and FIG. 8 shows radiation patterns at 5 GHz, peak gain ~6 dBi.

Whereas current MXN platforms allocate one antenna or N antennas for Multiple-Input-Multiple-Output (MIMO) systems to predetermined frequency bands, the present invention may integrate more radios into one platform using the multi-band to multi-band frequency reconfigurable antenna. In accordance with the present invention the mobile platform may adaptively tune to different configurations to meet end user requirements and to optimize radio performance in terms of RF interference rejection and ElectroMagnetic Interference and Capabilities (EMI/EMC) assessments. A minimum number of antenna elements may be used to support both MIMO and switch diversity.

By now it should be apparent that a multi-band frequency reconfigurable antenna with a single feeding point may be used to cover the five cellular bands that include GSM 850, PCS 1900, GSM 900, DCS 1800 and IMT 2000 and the two WLAN bands. The inventive reconfigurable antenna may reduce the number of required antennas and the number of associated RF switches while providing tunability that covers the wireless communication frequency bands. The savings in platform space from the reduction in RF switches and RF switch control lines provides a cost-effective multi-radio wireless platform environment.

Thus, by implementing natural higher order harmonics on multi-band reconfigurable antenna designs the antenna higher order resonance is used to build multi-band to multi-band frequency reconfigurable antenna. In these inventive embodiments the multi-band to multi-band frequency reconfigurability may be enabled using switches. Space allocation may be minimized and the number of RF cables through the hinge may be reduced.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A method of communicating using a multi-band to multi-band frequency reconfigurable antenna comprising:

tuning an antenna radiation element by placing a first switch and a second switch in a first position allowing the reconfigurable antenna to communicate in cellular bands;

tuning the antenna radiation element by placing the first switch and the second switch in a second position allowing the reconfigurable antenna to communicate in WLAN bands;

switching the first and second switches on or off at approximately a same time; and reusing a bended height in a microstrip line by placing the first switch and the second switch on a flexible substrate to reduce a height of a switch package.

2. The method of claim 1 wherein the first position is a closed position and the second position is an open position.

3. The method of claim 1 wherein the cellular bands include at least GSM 850, PCS 1900, GSM 900, DCS 1800 and IMT 2000.

4. The method of claim 1 further including using one DC switch control line to tune the antenna radiation element to the different multi-band stages.

5. The method of claim 1 further including using natural higher order harmonics on the multi-band reconfigurable antenna to dynamically adjust the multi-band to multi-band frequency reconfigurable antenna.

6. A multi-band tunable frequency reconfigurable antenna comprising:

first and second switches; and an antenna radiation element configurable to accommodate cellular frequency bands with the first and second switches placed in a first position and to accommodate WLAN frequency bands with the first and second switches placed in a second position, wherein the first and second switches are switched on or off at approximately a same time and the first and second switches are placed on a substrate to reduce a height in the antenna radiation element by reusing bended height in a microstrip line.

7. The multi-band tunable frequency reconfigurable antenna of claim 6 further including:

an input impedance of substantially 50 ohms feeding the antenna radiation element without extra matching requirements.

8. The multi-band tunable frequency reconfigurable antenna of claim 6 wherein choosing different antenna radiation element widths and shapes allows multiple higher order harmonic resonance modes to be tuned.

9. The multi-band tunable frequency reconfigurable antenna of claim 6 wherein the first and second switches are Field Effect Transistor (FET) switches.

10. The multi-band tunable frequency reconfigurable antenna of claim 6 wherein the first and second switches are PIN diode switches.

11. The multi-band tunable frequency reconfigurable antenna of claim 6 wherein the first and second switches are Micro-Electrical-Mechanical (MEM) switches.

12. A radio having a reconfigurable antenna comprising:

first and second switches configurable to both switch to a first position allowing the reconfigurable antenna to communicate in cellular bands and to both switch to a second position allowing the reconfigurable antenna to communicate in WLAN bands;

one DC switch control line coupled to the first and second switches, enabling tuning the reconfigurable antenna to different multi-band stages by switching the first and second switches on or off at approximately the same time; and a flexible substrate with the first and second switches attached to the flexible substrate, allowing reusing bended height in a microstrip line to reduce a height of a switch package.

13. The radio of claim 12 wherein the DC switch control line and RF signal lines are independent to avoid cross coupling and signal interference.

14. The radio of claim 12 wherein the switch package is placed inside a mechanical casing of a laptop lid.

* * * * *